TUNABLE TWO MODE CAVITY RESONATOR

Filed April 26, 1960

INVENTOR
W. B. MIMS
BY Roy M. Porter, Jr.
ATTORNEY

United States Patent Office 3,009,123
Patented Nov. 14, 1961

3,009,123
TUNABLE TWO MODE CAVITY RESONATOR
William B. Mims, New York, N.Y., assignor to Bell Telephone Laboratories, Incorporated, New York, N.Y., a corporation of New York
Filed Apr. 26, 1960, Ser. No. 24,688
11 Claims. (Cl. 333—83)

This invention relates to high Q cavity resonators and, more specifically, to those having more than one independently tunable mode of oscillation.

In very high frequency microwave applications, resonance is often established by hollow metal cavity resonators, suitably coupled to high frequency signal generating apparatus associated therewith. As is well known, it is possible to excite a number of fundamental modes of oscillation in a cavity resonator, the resonant frequencies of, as well as the relationship between the various modes being in general fixed, and a function of the resonator geometry. Accordingly, a change in the cavity configuration will generally result in a corresponding change in all of the possible modes supported within the cavity. It is also characteristic of such resonators that many of the field configurations capable of being supported therein are not sufficiently segregated or isolated from each other such that they may be selectively tuned by elements of priorly utilized types inserted within the cavity.

For these reasons, in the limited number of cavities priorly designed to support more than one fundamental resonant mode, either tuning of only one mode is attempted, or where tuning of both modes is accomplished, the tuning range of each mode has been nominal and the degree of independence in tuning of the two modes has proven inadequate for most resonant applications. As will presently be discussed in greater detail, these disadvantages have apparently arisen primarily because of the ineffective isolation between the corresponding fields of two resonant modes in prior conventional two-mode cavities.

Recently, there has been a need for a high Q tunable two-mode cavity resonator capable of supporting two fundamental resonant modes having their corresponding electric and magnetic fields perpendicular to each other and whose field intensities are uniform and maximum in a common region within the resonator. Such a cavity resonator has particular application in certain types of cavity masers and ferromagnetic amplifiers as well as in paramagnetic relaxation experiments.

In all of these applications, it would be particularly advantageous if the two resonant modes could be tuned independently of each other over a wide range of frequencies. Moreover, if such a cavity were used in a maser or in paramagnetic relaxation experiments, the active element or crystal specimen therein must generally be cooled to liquid helium temperatures as is well known. Thus, for economic reasons, it is important that a cavity used for such purposes be as small as possible for a given frequency range of operation so as to fit within a liquid helium Dewar of minimum diameter. Further, it would also be advantageous if the unloaded resonant frequencies of the two desired modes could not only be lowered but separated frequency-wise by a predetermined amount in a simple manner without either creating lossy joints between conductive elements, necessitating a modification of the outside dimensions of the cavity or otherwise adversely affecting the Q thereof.

Such desired characteristics, which are not found in priorly known two-mode cavities for the reasons pointed out above, would greatly increase the flexibility of a cavity, permit standardization of the parts thereof and increase its utility in various resonant microwave applications.

Accordingly, it is an object of this invention to tune two fundamental modes of oscillation independently of each other and over a substantially wide range of frequencies in a high Q cavity resonator.

It is another object of this invention to preadjust the natural resonant frequency separation between two fundamental modes of oscillation independently of the structure utilized to tune the modes severally and without requiring either lossy joints, a modification of the outside dimensions of the resonator or an adverse change in the Q thereof.

It is a further object of this invention to increase the independence in tuning of two fundamental resonant modes of oscillation while at the same time substantially reducing the natural unloaded resonant frequencies of the two modes for a given dimensioned cavity resonator.

In accordance with one aspect of this invention, substantial isolation of the orthogonal electric fields of two desired fundamental modes in a cavity of square or rectangular-shape is accomplished by positioning a conductive block, of predetermined size and/or configuration, within the central "capacitive" region of the resonator. This unique arrangement concentrates the orthogonal electric fields of the two modes between the respective adjacent surfaces of the block and the cavity and thereby makes the fields much more responsive to tuning elements inserted therein.

Having thus separated the mode fields, independent tuning of each mode is accomplished by a pair of retractable dielectric members severally positioned on opposite sides of the conductive block in regions of highly concentrated electric field of the mode to be tuned. Inasmuch as the electric fields of the two desired modes are orthogonal, it is thus seen that the individual dielectric members of the two pairs are arranged in space quadrature about the conductive block.

In accordance with another aspect of this invention, interchangeable loading blocks of different sizes and/or configurations are utilized to reduce substantially the unloaded resonant frequencies of two desired fundamental modes as well as to alter readily the frequency separation therebetween. These desired characteristics are accomplished without requiring either a modification of the outside dimensions of the cavity or otherwise adversely affecting the Q thereof. The blocks determine the resonant frequencies of the two modes in much the same way as does a capacitor in a tuned tank circuit. For example, assume that the size of a given conductive block is increased in only one dimension such that the spacing between adjacent surfaces of the block and cavity walls in regions associated with only one of the two desired orthogonal electric fields is decreased. This results in the capacitive loading of the cavity with respect to the mode in question being increased in much the same way as moving the plates of a condenser in a tuned tank circuit closer together. This increased capacitive loading effect on only one of the two modes therefore results in a decrease in the loaded resonant frequency thereof. Of course, if the spacing between adjacent surfaces of the block and cavity were made the same in corresponding regions of high electric field of both resonant modes, then the unloaded natural resonant frequencies of these modes would be lowered proportionally, and would be equal if the cavity were of square cross-section, for example. The degree to which the unloaded resonant frequencies of two fundamental modes is reduced and the degree of frequency separation therebetween are thus seen to be primarily dependent on both the size and the cross-sectional configuration of the loading block. As will be described in greater detail hereinafter, an upper limit on block size is reached when the block adversely modifies the magnetic fields to an extent whereby inductive loading offsets the desired capacitive loading of the cavity. A lower limit on the size of a loading block embodying features of this invention is reached when the block neither isolates nor concentrates the electric fields to an extent whereby a degree of independence in tuning of the two modes is effected over an appreciable frequency range, such as of the order of 10 to 25 percent, when suitable tuning members of the aforementioned type are employed.

In addition to the above-cited aspects and benefits derived from capacitive center block loading, such loading is also free from lossy joints between conductive elements and does not lead to an excessive deterioration in Q. In fact, in some resonance applications, there may be an overall gain in sensitivity due to a reduction in cavity volume and an increase in the sample filling factor.

A complete understanding of this invention and of these and other features thereof may be gained from a consideration of the following detailed description taken in conjunction with the accompanying drawing, in which.

Figure 3:
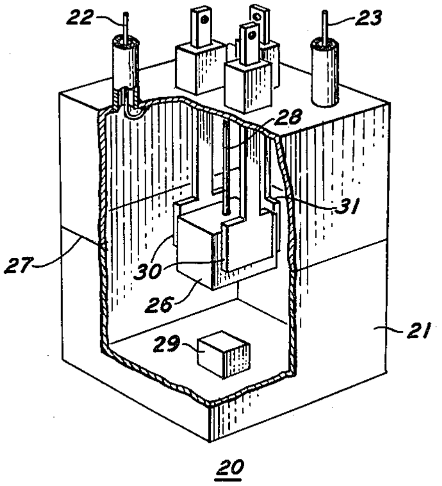
Figure 2:
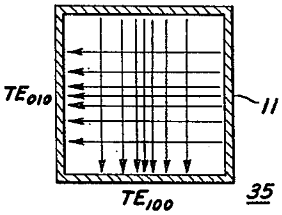
FIG. 2 is a plan view in section depicting the orientation of the $TE_{100}$ and $TE_{010}$ electric fields in an unloaded cavity resonator of square cross-section.

FIG. 3 is a partial cutaway isometric view of a rectangular cavity resonator embodying the principles of this invention; and FIGS. 4 through 8 are plan views in section of a cavity of the type depicted in FIG. 2 showing various alternative types of conductive loading blocks together with diagrammatic representations of the orthogonal electric field configurations of the $TE_{100}$ and $TE_{010}$ modes realized therewith in accordance with the principles of the instant invention.

Figure 1:
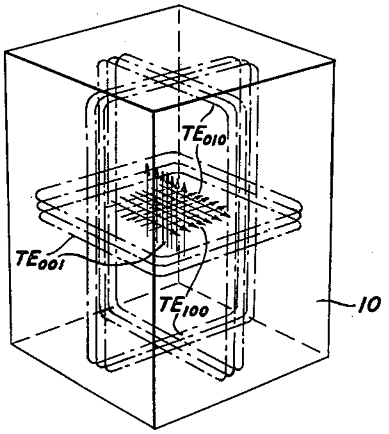
FIG. 1 is an isometric outline of a rectangular cavity showing the orientation of the respective electric and magnetic fields of three fundamental modes normally supported therein.

Referring now more particularly to FIG. 1, there is depicted in isometric outline form a rectangular cavity 10, shown for the purpose of giving a better understanding of the resonant modes of interest involved in the instant invention.

In accordance with standardized nomenclature, the two desired modes with which the instant invention is concerned, have technically become identified as the $TE_{100}$ and $TE_{010}$ modes and are identified as such in FIG. 1; the lines with arrows and the dotted-line enclosed loops designating the electric and magnetic field lines, respectively, of the two modes. As seen in the plan sectional view of a similar cavity 11 in FIG. 2, the $TE_{100}$ and $TE_{010}$ electric field lines continuously intersect throughout the cavity volume, their respective regions of maximum intensity being indicated by the spacing of the field lines. As a result, the two modes normally are not very responsive selectively to tuning elements inserted within the cavity such that a high degree of independence in the tuning of the respective modes over even a narrow range of frequencies is effected. A third fundamental mode designated the $TE_{001}$ mode, has electric and magnetic fields mutually perpendicular to the respective corresponding fields of the aforementioned modes as seen in FIG. 1. Obviously, in the case of a cubic, hollow cavity, all three fundamental modes would be identical, and the subscripts utilized to designate their respective fields within the cavity would be dependent solely on the particular orientation of the cavity with respect to a given reference picture plane.

As will be discussed in greater detail hereinafter, the third mode identified as the $TE_{001}$ mode in FIG. 1 is undesired and is substantially damped out in accordance with the principles of this invention.

FIG. 3 depicts a partially cutaway isometric view of a rectangular cavity resonator 20 embodying the principles of the instant invention comprising a hollow conductive shell 21, which may be of aluminum or copper, for example, and preferably having an interior coating or deposit of highly conductive material, such as silver or gold.

The resonator is excited with electromagnetic wave energy in the two desired $TE_{100}$ and $TE_{010}$ fundamental resonant modes, interchangeably referred to hereinafter as simply the two desired resonant modes, by means of coaxial line terminals 22 and 23 which are terminated within the cavity in the form of magnetic coupling loops. These loops may be rotatable and/or retractable in regions of strong magnetic field of the respective modes by suitable controls mounted on a supporting plate attached to the cavity, for example, not here shown. Alternatively, one magnetic coupling loop may be properly oriented and appropriately located with respect to the two desired orthogonal electric fields so as to excite oscillations in both modes, the second coupling loop then either being omitted or utilized as a tuning monitor, for example.

Figure 4:
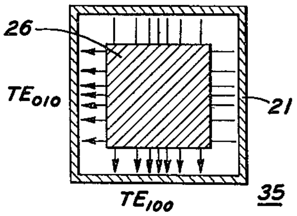

In accordance with a feature of this invention, the cavity 20 is capacitively loaded in the central region thereof by a conductive block 26, shown for purposes of illustration as being of square configuration. The block advantageously concentrates the orthogonal electric fields of the two desired modes between the respective adjacent surfaces of the block and cavity such that the two fields are substantially isolated from each other, as best seen in FIG. 4. In FIG. 4 the cavity shell and conductive block are identified by the same reference numerals that are used to identify the corresponding structure in FIG. 3. The field isolation between the $TE_{100}$ and $TE_{010}$ modes resulting from the presence of the block has been found to increase substantially the independence in tuning of the two fundamental modes over a wide band of frequencies, the tuning structure for which will be discussed in greater detail hereinafter.

In accordance with another feature of the invention, each of the two resonant modes is tuned independently of the other by a pair of dielectric tuning members 30, 31, each pair being diametrically positioned with respect to the conductive block 26 in regions of high electric field of a different one of the two desired resonant modes. Such an arrangement affords a degree of independence in the tuning of the two modes over a range of 10–25 percent which has not been found possible with priorly known cavities of either the loaded or unloaded types. Only one member of the pair of tuning members 31 is seen in FIG. 3. The individual dielectric members of the two pairs are thus seen to be arranged in space quadrature about the conductive block 26. It is to be understood of course that a single tuning member for each mode may be utilized in certain applications where a relatively narrow tuning range is sufficient. The dielectric tuning members may be made of any suitable ceramic, such as SC24 ceramic (dielectric constant 9) which has been found to be very effective in tuning the respective modes. The tuning members are preferably connected in pairs by suitable brass brackets, with tuning being varied by two micrometers, the movement thereof being transmitted, such as by stainless steel tubing, to the brackets which hold the dielectric tuning members. This tuning apparatus may be secured to a suitable supporting plate on the upper side of the cavity, for example. This external tuning apparatus has not been shown for reasons of convenience and simplicity.

Figure 5:
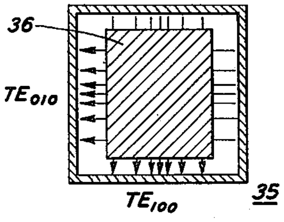
Figure 6:
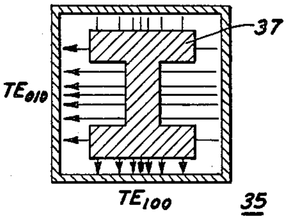
Figure 7:
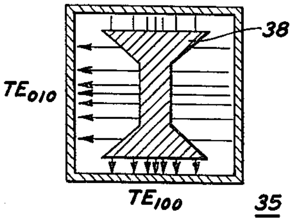

The natural loaded frequency separation between the two desired resonant modes is readily altered in accordance with a feature of this invention by providing a number of loading blocks of different predetermined sizes and/or configurations which are quickly and simply interchanged within the cavity. In order to facilitate such an interchangeability of blocks, the cavity is constructed in two halves along the joint 27 with the block 26 being supported by a single pin 28 of either conductive or dielectric material, preferably threaded into the block. By simply removing the lower half of the cavity shell 21 and unthreading the block from the pin, a new block may be easily inserted within the cavity. The joint 27 also serves an additional function described in detail hereinafter. FIGS. 5 through 8 depict plan sectional views of a cavity 35, similar to cavity 20 of FIG. 3, with various types of capacitive loading blocks centrally positioned therein which advantageously may be utilized to alter the natural resonant frequency separation between the two desired $TE_{100}$ and $TE_{010}$ modes as well as to isolate substantially and concentrate the respective electric fields thereof, as shown. In contrast to the square conductive block 26 depicted in FIG. 4 which gives nearly equal lowered, loaded resonant frequencies for the two desired modes in a cavity of square cross-section, the block 36 of rectangular cross-section depicted in FIG. 5 gives a moderate frequency separation and the I-shaped blocks 37 and 38 depicted in FIGS. 6 and 7, respectively, give large frequency separations between the two desired resonant modes. As previously mentioned, capacitive loading increases and the resonant frequency decreases for a given mode as the spacing between adjacent surfaces of the block and cavity in the regions of high electric field of the mode in question decreases. Accordingly, in FIGS. 5, 6 and 7 the $TE_{100}$ mode, whose field lines are highly concentrated within small spaces on opposite sides of the respective loading blocks, is resonant at a lower frequency than the $TE_{010}$ mode. The sharpened edges shown in block 38 of FIG. 7 have been found to minimize capacitive loading in the $TE_{010}$ mode, represented by the horizontal electric field lines depicted therein.

Figure 8:
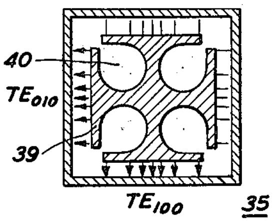

FIG. 8 illustrates another loading block 39 of novel form which is particularly effective in substantially lowering the unloaded natural resonant frequencies of the two desired modes for a given dimensioned cavity. This block, depicted as being of square configuration, has four symmetrically positioned bores 40 extending therethrough in the direction parallel to the magnetic field lines of the two desired modes. This block configuration has been found particularly advantageous in minimizing the perturbations of the magnetic fields when the capacitive loading of the cavity is very high; in other words, when the volume of the conductive block is large compared to the volume of the resonant chamber of the cavity. While the bores in this block are shown as circular and symmetrically located in the corners of the block, it is to be understood that any removal of the central portion of the block that would minimize perturbations of the two desired magnetic fields without adversely affecting the electric fields may be utilized. Thus, bores of square or triangular shape may be utilized and in regions of the block other than at the corners thereof, as shown.

It might at first appear that as the size of a solid loading block is increased (thus making the space between the block and the cavity walls smaller), the capacitive loading should increase, the natural loaded resonant frequencies of the two modes should decrease and the degree of independence in the tuning of the respective modes should increase by reason of a higher degree of isolation between the electric fields of the two modes. This does not prove to be the case, however, as a point is reached whereat the presence of a solid block in high magnetic field regions results in inductive loading of the cavity to an extent which offsets the desired capacitive loading. An ultimate limiting point is reached of course when the magnetic fields are so seriously altered by the size of a solid block that resonance in the desired modes becomes unstable or erratic. Accordingly, the apertured loading block 39 of FIG. 8 is thus designed to minimize inductive loading of the cavity and prevent serious perturbations of the respective magnetic fields which would otherwise exist with a solid conductive block of the same given outside dimensions.

In accordance with the invention, the third undesired fundamental $TE_{001}$ mode is sufficiently damped out by the circumferential joint 27 centrally located in the cavity wall. The joint 27 is purposely made slightly irregular and, as a result, acts effectively as a radio-frequency choke to the undesired mode.

By way of example, and offered only to illustrate the effectiveness and versatility of a cavity resonator embodying the principles of this invention, data will be given hereinbelow on both the actual tuning range and the degree of independence in tuning realized with a cavity resonator of the type depicted in FIG. 3, when capacitively loaded with various blocks of the types depicted in FIGS. 4 through 8.

By way of background, the constructed cavity was designed to provide two independently tunable modes in the 4 to 9 kmc. frequency range and yet dimensioned small enough to fit inside a liquid helium Dewar of 1½ inch inside diameter. To meet these requirements, the rectangular cavity was constructed to have inside dimensions of .670 x .670 x .866 inch which resulted in fundamental unloaded resonant frequencies of 11.8 kmc. for the two desired $TE_{100}$ and $TE_{010}$ modes and 12.48 kmc. for the third undesired $TE_{001}$ mode. In accordance with the principles of this invention, the third undesired mode was damped out and the two desired modes were selectively shifted and lowered to frequencies in the range of 4 to 9 kmc. by an appropriate choice of capacitive loading block, the operating effects of which are evidenced by the tabulated data in the following chart:

| | High end, mc. | $\Delta\nu$, mc. | Low end, mc. | $\Delta\nu$, mc. | Tuning range, mc. |
|---|---|---|---|---|---|
| Square block (FIG. 4) (.670″ x .670″ x .280″): | | | | | |
| $TE_{101}$ mode | 7,700 | 50 | 7,075 | 45 | 625 |
| $TE_{010}$ mode | 7,700 | 50 | 7,095 | 30 | 605 |
| Rectangular block (FIG. 5) (.350″ x .475″ x .280″): | | | | | |
| $TE_{101}$ mode | 6,220 | 25 | 5,150 | 20 | 1,070 |
| $TE_{010}$ mode | 7,940 | 190 | 7,265 | 135 | 675 |
| I block (FIG. 6) (.350″ x .492″ x .280″): | | | | | |
| $TE_{101}$ mode | 5,005 | 25 | 4,010 | 15 | 995 |
| $TE_{010}$ mode | 8,650 | 375 | 7,900 | 300 | 750 |
| I block (FIG. 7) (.350″ x .475″ x .280″): | | | | | |
| $TE_{101}$ mode | 5,280 | 25 | 4,400 | 2 | 880 |
| $TE_{010}$ mode | 9,150 | 305 | 8,500 | 255 | 650 |
| Aperatured block (FIG. 8) (.50″ x .50″ x .280″): | | | | | |
| $TE_{101}$ mode | 5,000 | 50 | 3,850 | 50 | 1,150 |
| $TE_{010}$ mode | 5,000 | 50 | 3,850 | 50 | 1,150 |

In the chart, $\Delta\nu$ represents a measure of tuning. Specifically, it represents the change in frequency of one mode when the tuning control for the other mode is taken from one extreme end to the other. It is also noted that the last dimension given for the various blocks is the vertical dimension which is the same for all of the blocks tested. In the case of the I blocks of the types depicted in FIGS. 6 and 7, the rectangular portions had a width of 0.100 inch. The diameter of the bores in the apertured block, FIG. 8, measured 0.20 inch.

As can be readily seen from the chart, all of the loading block geometries tabulated advantageously substantially isolate the electric fields of the two desired modes and concentrate the respective fields thereof between the adjacent surfaces of the block and cavity such that it is possible to obtain a high degree of independence in the tuning of the modes in a range of 10–20 percent. Moreover, as a result of the concentrated electric field regions, wide band tuning is effected without requiring dielectric tuning members of large cross-section.

It is significant to note, however, that increasing the cross-sectional area of the dielectric tuning members has been found to have no appreciable adverse effect on the resonant characteristics of the cavity, but to the contrary, may effect an increase in the tuning range of the respective modes to a value exceeding 25 percent of their natural loaded resonance frequencies. Loaded Q values for the cavity with the various blocks designated in the chart above, corrected for coupling losses, were all in the vicinity of 3,000 and indicated that center block loading of the type described herein leads to no serious deterioration in cavity performance. In fact, in some resonance applications there may be an overall gain in sensitivity as a result of the reduction in cavity volume and the increase in sample filling factor. With all of the blocks tested above, the lower third of the cavity volume was left free for the mounting of an active ferromagnetic element or test specimen 29 and, as seen from FIG. 1, it is this volume which contains a common region wherein the two desired magnetic fields of the $TE_{100}$ and $TE_{010}$ modes are of maximum intensity and mutually perpendicular to each other. Significantly, the loaded resonant frequencies of the described cavity are not appreciably altered by the insertion of various specimens of different sizes. The completed cavity may be readily sealed in an enclosure during use in applications requiring refrigeration, thereby keeping the resonant chamber free of air, moisture and liquid helium.

It is to be understood that the specific embodiment described herein is merely illustrative of the general principles of the instant invention. For example, only a representative sampling of loading blocks of various sizes and configurations have been illustrated for use with one specific type of cavity. Obviously, numerous other structural arrangements and modifications may be devised in the light of this disclosure by those skilled in the art without departing from the spirit and scope of this invention.

What is claimed is:

1. In combination, a high Q cavity resonator of rectangular configuration adapted to support two fundamental modes having their respective electric and magnetic fields perpendicular to each other when the cavity is excited with electromagnetic wave energy, said magnetic fields forming mutually perpendicular sets of closed magnetic loops within said cavity, each set of magnetic loops defining a region of maximum magnetic field intensity along a plane parallel to said loops and passing through the center of said cavity, means for substantially isolating and concentrating the electric fields of said two modes for increasing the independence in tuning thereof over a wide range of frequencies, said means comprising a conductive block centrally positioned within and capacitively loading said cavity and surrounded by said magnetic fields, said block having four planar surfaces each mutually opposed with a different cavity side wall in a region of maximum electric field intensity.

2. The structural combination of claim 1 wherein said conductive block is of square cross-section in the direction perpendicular to the electric field lines of said two modes.

3. The structural combination of claim 1 wherein said conductive block is of rectangular cross-section in the direction perpendicular to the electric field lines of said two modes.

4. The structural combination of claim 1 wherein said conductive block is I-shaped in cross-section in the direction perpendicular to the electric field lines of said two modes, the corners of said I-shaped block being squared.

5. The structural combination of claim 1 wherein said conductive block is I-shaped in cross-section in the direction perpendicular to the electric field lines of said two modes, the top and bottom horizontal segments of said I-shaped block being tapered inwardly from their outermost extremities, respectively, toward the center vertical segment of said block.

6. The structural combination of claim 1 wherein said conductive block is of rectangular cross-section in the direction perpendicular to the electric field lines of said two modes and having a plurality of symmetrically positioned bores extending therethrough in a direction perpendicular to the plane of said cross-section.

7. In a high frequency system, a substantially closed rectangular cavity of high Q adapted to support two fundamental modes having their respective electric and magnetic fields perpendicular to each other when the cavity is excited with electromagnetic wave energy, said magnetic fields forming mutually perpendicular sets of closed magnetic loops within said cavity, each set of magnetic loops defining a region of maximum magnetic field intensity along a plane parallel to said loops and passing through the center of said cavity, means for substantially isolating and concentrating the electric fields of said modes for increasing the independence in tuning of said modes over a wide range of frequencies, said means comprising a conductive block centrally positioned within and capacitively loading said cavity and surrounded by said magnetic fields, said block having four planar surfaces each mutually opposed with a different cavity side wall in a region of maximum electric field intensity and dielectric means associated with each of said modes for independently tuning the resonant frequencies thereof.

8. A high-frequency system in accordance with claim 7 wherein said dielectric means comprises two pairs of dielectric members, each pair being retractable and diametrically positioned with respect to said conductive block in regions of concentrated electric field of the mode with which they are associated.

9. In combination, a high Q substantially closed cavity resonator of rectangular configuration normally adapted to support three fundamental modes of resonance having their respective electric and magnetic fields perpendicular to each other when the cavity is excited with electromagnetic wave energy, said magnetic fields forming mutually perpendicular sets of closed magnetic loops within said cavity, each set of magnetic loops defining a region of maximum magnetic field intensity along a plane parallel to said loops and passing through the center of said cavity, means for substantially isolating and concentrating the electric fields of two of said modes for increasing the independence in tuning of said modes over a wide range of frequencies, said means comprising a conductive block of predetermined size and configuration centrally positioned within and capacitively loading said cavity and surrounded by said magnetic fields, said block having four planar surfaces each mutually opposed with a different cavity side wall in a region of maximum electric field intensity, and means for suppressing oscillations in the other of said three modes, said last-mentioned means comprising a circumferential joint centrally located in the side walls of said cavity, perpendicular to the electric field lines of said other mode, said joint thereby acting as a radio-frequency choke to said other mode.

10. The structural combination of claim 9 further comprising dielectric means associated with each of said two modes for independently tuning the resonant frequencies thereof.

11. The structural combination of claim 10 wherein said dielectric means comprises two pairs of dielectric members, each pair being retractable and diametrically positioned with respect to said conductive block in regions of concentrated electric field of the mode with which they are associated.

References Cited in the file of this patent

UNITED STATES PATENTS

| | | |
|---|---|---|
| 2,496,772 | Bradley | Feb. 7, 1950 |
| 2,909,654 | Bloembergen | Oct. 20, 1959 |
| 2,943,284 | Bakura et al. | June 28, 1960 |
| 2,945,744 | Knox | July 19, 1960 |